June 24, 1958     W. G. PERSINGER     2,839,989
BARBEQUE GRILL ATTACHMENT
Original Filed Oct. 25, 1954     2 Sheets-Sheet 1

INVENTOR:
WILLIAM G. PERSINGER,
BY Lyon & Lyon
ATTORNEY.

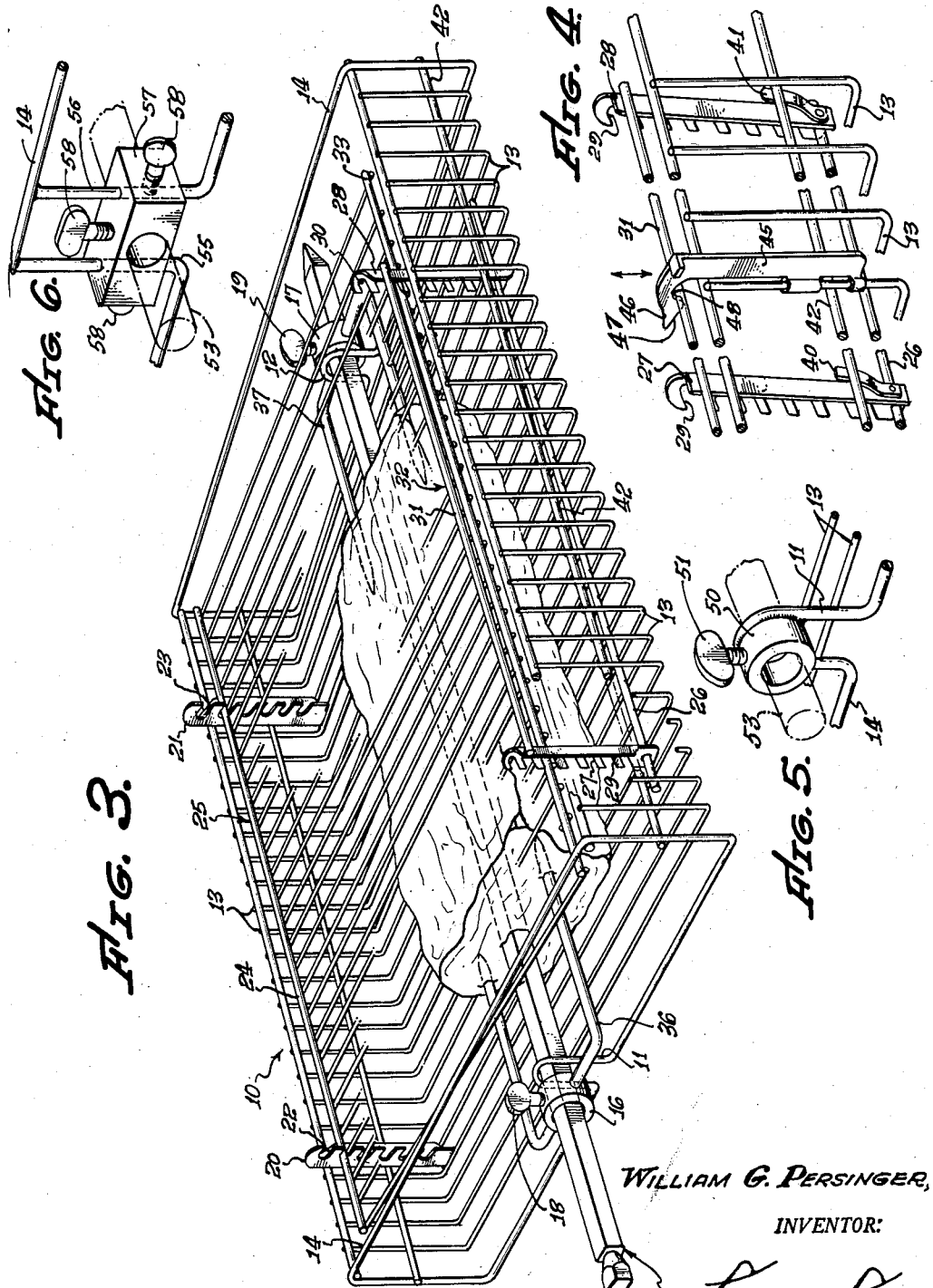

United States Patent Office 2,839,989
Patented June 24, 1958

2,839,989

BARBEQUE GRILL ATTACHMENT

William G. Persinger, Los Angeles, Calif., assignor to Laverne O. Persinger, Burbank, and Merle L. Persinger, Glendale, Calif.

Continuation of application Serial No. 464,249, October 25, 1954. This application October 17, 1956, Serial No. 616,560

24 Claims. (Cl. 99—421)

This invention relates to barbecue equipment and has particular reference to devices for supporting food products during barbecue grilling operations, the present application being a continuation of my application, Serial No. 464,249, filed October 25, 1954.

In present day practice, the food material to be grilled is generally placed on a spit which is rotatable to expose every portion of the material to the heat in order to insure uniformly perfect grilling. There are times, however, when such spit is incapable of or insufficient properly to support the foodstuff to be grilled because of the shape and texture thereof. In such cases it becomes necessary to place the material on the stationary grill of the barbecue stand and to use some sort of scoop or fork manually to turn over the material. This method is not only slow, cumbersome and spattering but, because the material becomes grilled on two sides only, incapable of producing a perfectly grilled product.

It is in view of the foregoing the object of the present invention to provide a device capable of supporting articles of food of the various shapes, sizes and textures suitable for barbeque grilling in such manner that uniformly perfect grilling may be insured. A further object is to provide a device of the character described which may be mounted on the type of spit ordinarily employed for operation in the usual manner. Another object is to provide a barbeque support constructed, shaped and so operable that melting fat is mostly discharged outside the center of the fire area of the stand thereby to minimize odor-filled splashings. These and other objects of the invention as well as the many advantageous features thereof will become apparent upon perusal of the following detailed description and by referring to the accompanying drawing in which a preferred form of the invention is illustrated.

In the drawings:

Fig. 3 is a perspective view, on a larger scale, of the device of the invention as it appears when removed from the barbeque stand;

Fig. 4 illustrates means for interlocking parts of the invention.

Fig. 5 is a detail view showing means for locking the device of the invention in position on a spit; and Fig. 6 illustrates a modification of this locking means.

Figure 1:
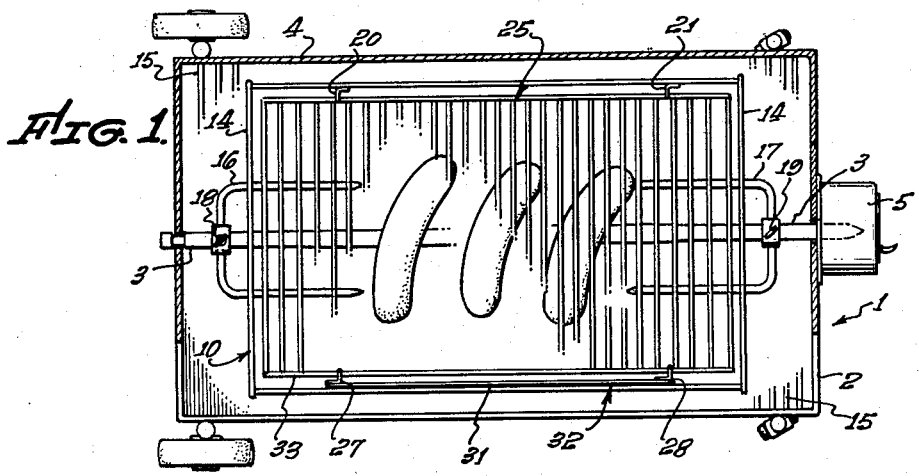
Fig. 1 is a plan view of a barbeque stand on which the device of the invention is shown placed.
Figure 2:
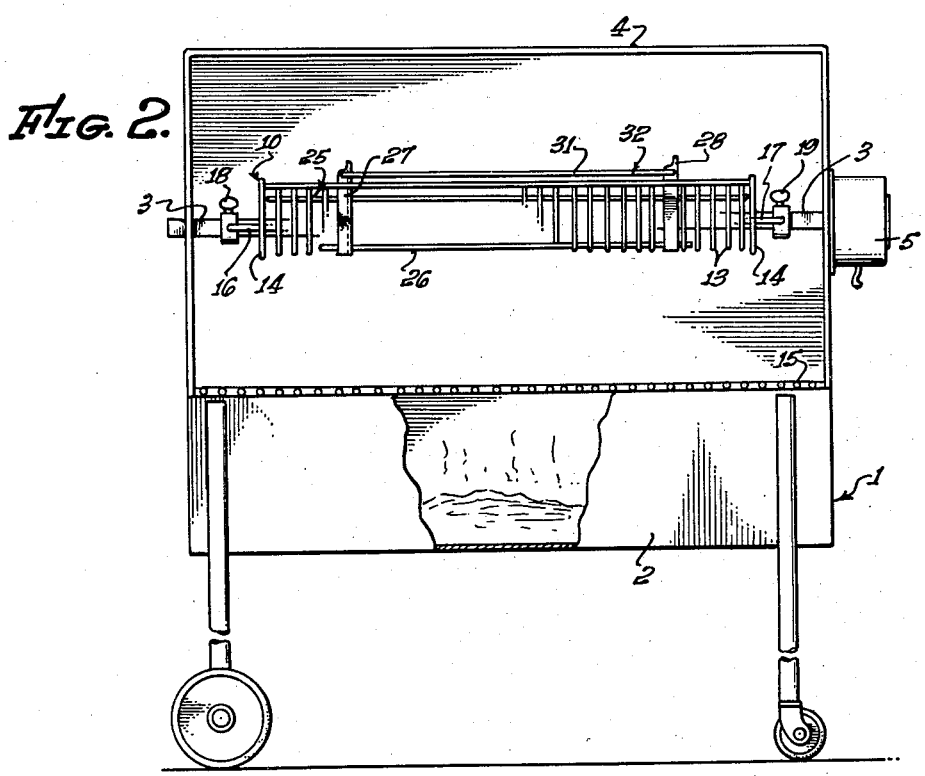
Fig. 2 is a substantially corresponding front elevational view of the device of Fig. 1, with a portion of the stand broken away for the sake of clearness.

The device of the invention, in the form illustrated in the drawings, is shown mountable on a barbeque stand 1 of conventional shape. Such stands usually include a brazier 2 on which is mounted supports for a spit 3. These supports are shown embodied in a hood 4, but any other well known type of support may be substituted. This spit may be manually rotated but electrical equipment is generally employed to rotate the spit as required for perfect grilling. Such conventional electrical equipment is indicated at 5 in Figs. 1 and 2.

The device of the invention comprises a rectangular tray or basket 10 in the ends of which are provided loops 11, 12 forming bearings for the spit. The spit is in Fig. 3 shown square in cross-section and of a size snugly to fit within the parallel legs of the loops rising from the base of the basket. When so constructed, it is found that rotation of the spit also imparts rotation to the basket. The loops 11, 12 should be high enough to allow the spit to adjust itself to the thickness of the food material carried thereon. The basket is composed of a series of equidistantly spaced wires 13 transversely extending across the base of the basket and perpendicularly rising at its sides to the top frame 14 thereof to form a grid above and similar to the stationary grid 15 of the brazier.

A pair of brackets 20, 21 are welded or otherwise rigidly secured to the inner surfaces of the basket at the left side thereof and they extend vertically from its base a short distance above the top frame 14. Both brackets are shown recessed to provide downwardly and inwardly inclined notches 22, 23 of a size fittingly to receive therein the left side rod 24 of an upper grid 25. A rod 26 is secured to the upper surface of the base near the right side thereof and parallel to the sides of the base. This rod is designed rotatably to support a pair of brackets 27, 28 in transverse alignment with the brackets 20, 21 and similarly provided with downwardly and inwardly directed notches 29, 30. A rod 31 interconnects the upper ends of the brackets 27, 28 to form therewith a frame 32 which may be manually tilted to receive the right side edge 33 of the upper grid 25 in the manner and for the purpose which will now be described.

The basket is designed to support foodstuff to be barbequed, such as frankfurters, a boned leg of lamb or some apples or vegetables. This material is first placed in the basket whereupon the rod 24 at the left side edge of the upper grid 25 is pushed into the notches of the brackets 20, 21 which most nearly appear to suit the thickness of the foodstuff to be grilled. The upper grid is then manually swung downward sufficiently to compress the material in the basket whereupon the frame 32 is swung inwardly to cause the right side rod 33 of the upper grid to enter the notches 29, 30 of the frame which at the time are most nearly in registration with the rod. The pressure exerted by the incased material will now maintain the upper grid locked so firmly in position that the spit may be rotated to turn the basket into the various positions required for the barbeque operations without danger of dislocating the material. Where a large and heavy cut of meat is to be grilled, it may also be found advantageous to mount forks 16, 17 on the spit, substantially as indicated in Fig. 3. Such forks are part of conventional barbeque equipment and they are secured in adjusted position on the spit by means of clamping screws 18, 19.

Foodstuff will shrink during the grilling operation and in cases where the shrinkage is considerable, may relieve the pressure sufficiently to unlock the upper grid. There is then danger that the grid may become dislodged from the notches of the brackets and during rotation of the basket to drop away therefrom. It is for this reason found advisable to provide means for more securely locking the upper grid in position during the grilling. Such means is in Fig. 4 shown to include a pair of springs 40, 41 which are rigidly secured in position on the brackets 27, 28 and shaped to rest against the reinforcing rod 42 of the basket. The pressure exerted by these springs urges the frame 32 inwardly and it becomes necessarily manually to draw the frame outwardly into the position shown in Fig. 4 in order to mount the upper grid in position. Since manually holding the frame withdrawn during this operation may be found inconvenient, I have found it advisable to lock the frame in its retracted position. This may be done by mounting a slide 45 on the vertical portion of one of the wires 13 of the basket, intermediate the brackets 27, 28, substantially as indicated in Fig. 4. The upper end of this slide is at 46 shown downwardly curved to engage the connection rod 31 of the frame 32. When this frame is manually retracted, it is found that the connecting rod 31 will ride along the inclined suface 47 of the slide to elevate the slide until the rod moves into registration with the notch 48 thereof and so releases the slide for gravitational downward movement to lock the frame 32 in retracted position. Once the upper grid has been pressed downward against the foodstuff in the basket it is merely required manually to raise the slide to release the frame and the springs 40, 41 will swing the released frame inwardly to cause the required notches 29, 30 of the brackets to engage the side rod 33 of the upper grid. The spring will now maintain the upper grid locked in position even in cases where considerable shrinkage of the foodstuff occurs.

As shown in the drawings, the spit may be square in cross section and snugly seated in the loops 11, 12 to impart rotation to the basket. While this simple construction is entirely satisfactory in cases where the loaded basket is light and the basket slowly and carefully rotated therewith, it may be found advantageous more securely to interlock the spit and basket. This may be done in the manner illustrated in Fig. 5. A sleeve 50, similar to the sleeve 16, is secured in position on the loop 11, as by a soldering or welding operation, and the spit is locked in position therein by the set screw 51. It is to be understood that a similar sleeve will be secured to the loop 12 at the other end of the basket. When such sleeves are combined with the loops of the basket, the cross sectional shape of the spit 53 is immaterial. This interlocking means has been found entirely satisfactory in all cases where relatively thin foodstuff, such as chops, steaks or frankfurters, are placed in the basket on top of the spit. But where large chunks of meat or vegetables are placed in the basket and particularly when the forks 16, 17 are required to maintain the chunks in position I have found it advantageous to embody in this interlocking device means affording the basket some freedom of vertical movement on the spit. The device of Fig. 5 may, for this purpose, be somewhat modified, substantially as illustrated in Fig. 6.

The loops 11, 12 of the basket are in this view shown redesigned to provide, at each end of the basket, a pair of vertically directed stems 55, 56 on which blocks 57 are fitted to slide. These blocks replace the sleeves 50 and they are, like the sleeves, perforated to receive the spit. A set screw 58, similar to the set screw 51, clamps the spit in position within each block. When so constructed, it is seen that the basket may adjust itself vertically on the stems to suit the thickness of the foodstuff placed on the spit before the spit is clamped in position. If, in addition, forks 36, 37 are required better to support the material, these forks may be placed on the spit with the sleeves 16, 17 positioned within or outside of the blocks 57 as may be found most effective.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A support for articles of food mountable on a rotatable spit of a barbecue stand comprising, a basket-shaped grill mountable for limited vertical adjustment on the spit and rotatable therewith, vertically directed brackets rigidly secured to one inner side edge of the grill, said brackets having downwardly and inwardly directed notches in the inner side edges thereof, a similarly notched frame pivotally mounted near the bottom of the basket at the opposite side edge thereof, and an upper grid having one side edge engaging notches of the basket for downward swinging movement therein against the articles of food placed therein, movement by the downwardly swinging upper grid of said frame on its pivot causing notches thereof to engage the opposite side edge of the upper grid to lock the upper grid in food clamping position within the basket.

2. A device as set forth in claim 1 in which means is provided for locking the grill in any required vertical position of adjustment on the spit.

3. A device as set forth in claim 1 in which forks are mountable for axial adjustment on the spit, and means for locking the forks in adjusted position on the spit.

4. A support for articles of food mountable on a rotatable spit of a barbecue stand comprising, a basket-shaped grill mounted for vertical adjustment on the spit and rotatable therewith, vertically directed brackets rigidly secured to one inner side edge of the grill, said brackets having downwardly and inwardly directed notches in the inner side edge thereof, a similarly notched frame pivotally mounted near the bottom of the basket at the opposite side edge thereof, and an upper grid having one side edge engaging notches of the basket for downward swinging movement therein against the articles of food placed therein, and spring means urging inward movement of said frame on its pivot, the frame being manually retractable, release of the frame causing notches thereof to engage the opposite side edge of the downwardly pressed upper grid to lock the upper grid in food clamping position within the basket.

5. A device as set forth in claim 4 in which manually releasable means is provided for locking the frame in retracted position.

6. A device as set forth in claim 4 in which an element is seated for vertical movement in the basket to lock the frame in retracted position therein and again to release the frame for movement by the spring means to lock the upper grid in food clamping position.

7. A device as set forth in claim 4 in which means is provided for locking the grill in vertically adjusted position on the spit.

8. A two piece barbecue basket comprising, a basket member and a lid member, said basket member being generally rectangular and comprising a series of parallel spaced U-shaped wires joined together at their upper ends with said rods extending generally perpendicularly to the longitudinal axis of the rectangular basket member, said U-shaped wires defining generally the bottom and sides of said basket member, said basket member having rods at the ends thereof which extend between the sides with centrally deformed portions defining generally centrally aligned apertured portions through which a spit is arranged to extend to assure rotation about the longitudinal axis of said rectangular basket member, and also to provide a driving connection between the spit and basket member, said lid member being generally rectangular and smaller in cross section than said basket member so that said lid member may be inserted completely in said basket, and releasable clamping means between the sides of said basket member and said lid member to maintain said lid member pressed against comestibles placed on the bottom of said basket member.

9. A basket as set forth in claim 8 in which said releasable clamping means comprises a bracket member extending inwardly from each side of said basket member and engaging a corresponding edge of said lid member.

10. A basket as set forth in claim 8 in which said centrally deformed portions are positioned to engage a fork carried on the spit.

11. A two piece barbecue grill basket assembly comprising, a basket member and a generally rectangular lid member, said basket member having a bottom portion, a side portion and two end portions, spaced axially aligned socket means on said basket centrally disposed near each of said end portions and said bottom portion through which a spit may extend, a spit extending through said socket means, cooperating selectable hook means between said side portion and one side of said lid member for adjustably securing one side of said lid member on said side portion in different elevated positions with respect to said bottom portion, and means hinged near said bottom portion for selectively engaging the other side of said lid member for adjustably securing the same at different elevated positions with respect to said bottom portion.

12. A rotatable food containing barbecue grill basket assembly comprising, a basket member and a generally rectangular lid member, spaced axially aligned and centrally disposed bearing portions mounted on said basket member for receiving a supporting spit and for supporting said assembly on said spit, a spit passing through said bearing portions, said basket member having a bottom portion, a plurality of members spaced upwardly from said bottom portion and at different heights to which one side of said lid member may be selectively hooked at different adjusted elevations with respect to said bottom portion, and element pivoted near said bottom portion and having a plurality of spaced portions at different elevations with respect to said bottom portion for releasably securing the other side edge of said lid member.

13. A two piece rotatable food containing barbecue grill basket assembly comprising, a lid member, an open top receptacle into which said lid member is disposed and releasably secured at different elevations with respect to the bottom portion of said receptacle, spaced axially aligned bearing portions on said receptacle for receiving a supporting spit and for supporting said assembly on said spit, means for releasably securing said lid member in said receptacle at different selected elevated positions with respect to the bottom portion of said receptacle, said means comprising a plurality of elements spaced upwardly from said bottom portion to which one side of said lid member is secured, said means comprising also spaced elements pivoted with respect to said bottom portion and located at different heights with respect to said bottom portion for releasably engaging the other side edge of said lid member.

14. An assembly as set forth in claim 13 including means for maintaining said pivoted elements in contacting engagement with said other side portion of said lid member.

15. A rotatable food containing barbecue grill basket assembly comprising, an open receptacle and a lid member for closing said receptacle, said receptacle having spaced axially aligned bearing portions for receiving spit and for supporting said assembly on said spit, said receptacle having a plurality of elements at one side edge of said receptacle and spaced at different heights with respect to the bottom portion of said receptacle for releasably engaging a portion of said lid member, said receptacle having a plurality of elements pivoted near said bottom portion and spaced at different heights with respect to said bottom portion for engaging a portion of said lid which is oppositely disposed to said first mentioned portion, and a spit extending through said bearing portions.

16. An assembly as set forth in claim 15 including means on said receptacle for maintaining said pivoted elements in engagement with said other portion of said lid member.

17. A two piece rotatable food containing barbecue grill basket assembly comprising, a basket member and a lid member, said basket member having a bottom portion, two side portions and two end portions, spaced axially aligned socket means on said basket centrally disposed near said end portions and said bottom portion for receiving spit and for supporting said assembly on said spit, first bracket means mounted on said basket member near one of said side portions and having a plurality of hook elements which are vertically spaced upwardly from the bottom portion with each of said hook elements extending generally downwardly in the direction of said bottom portion, second bracket means on said basket member and near the other side of said basket member, said second bracket means comprising a series of spaced hook elements, each of which extends generally downwardly in the direction of said bottom portion, said lid member being mounted on said basket member to close the same by a selected one of each of the first and second mentioned hook elements releasably engaging said lid member.

18. A two piece rotatable food containing barbecue grill basket assembly comprising, a basket member and a lid member, said basket member having a bottom portion and two side portions, spaced axially aligned socket means on said basket centrally disposed thereon near said bottom portion for receiving a spit and for supporting said assembly on said spit, first and second bracket means mounted on said basket member and disposed near corresponding side portions of said basket member, each of said bracket members comprising a series of spaced hook elements which are vertically spaced with respect to said bottom portion, each of said hook elements extending generally downwardly in the direction of said bottom portion and serving as a means for selectively engaging said lid member, said lid member being mounted on said basket member to close the same by a selected one of each of a corresponding hook element on said first and second bracket means releasably engaging said lid member.

19. A two piece rotatable food containing barbecue grill basket assembly comprising, a basket member and a lid member, said basket member having spaced axially aligned socket portions thereon for receiving a spit and for supporting said assembly on said spit, cooperating selectable hook means near one side portion of said basket member for adjustably securing one side of said lid member on said side portion in different elevated positions with respect to the bottom portion of said basket member, and second cooperating hook means mounted on said basket member near the other portion of said basket member for selectively engaging the other side of said lid member for adjustably securing the same at different elevated positions with respect to said bottom portion, said lid member being mounted on said basket member to close the same by said first and second hook means releasably engaging said lid member.

20. A two piece rotatable food containing barbecue grill basket assembly comprising, a basket member and a lid member, spaced axially aligned socket means on said basket member for receiving a spit and for supporting said assembly on said spit, a spit passing through said socket means, said basket member having a first and a second side portion, a first bracket on said basket member near said first side portion and comprising a series of hook elements which extend downwardly in the direction of the bottom portion of said basket member for selectively and releasably securing a first portion of said lid member, a second bracket member on said basket member near said second side portion of said basket member and comprising a series of spaced hook elements which extend downwardly in the direction of said bottom portion for selectively and releasably securing a second portion of said lid member.

21. A rotatable food containing spit basket for comestibles mountable on a rotatable spit of a barbecue stand comprising, a generally recangular basket shaped grill having spaced ends and spaced sides and mountable on the spit and rotatable therewith, said spaced ends having axially aligned rounded aperture portions for receiving a spit and for supporting said spit basket on said spit; a spit passing through said aperture portion, spaced means on each side of said basket shaped grill, and an upper generally rectangular grid having spaced side portions connected to a corresponding one of said means and maintaining said upper grid on said basket shaped grill.

22. A rotatable food containing spit basket for comestibles mountable on a rotatable spit of a barbeque stand comprising, a basket shaped grill mountable on the spit and rotatable therewith, axially aligned means on the side edges of the grill for receiving a spit and for supporting said spit basket on said spit, and an upper grid connected to said spaced means maintain said upper grid on said basket shaped grill and a spit passing through said axially aligned means.

23. A rotatable food containing spit basket for articles of food mountable on a rotatable spit of a barbeque stand comprising, a generally rectangular basket shaped grill having spaced ends and spaced sides and mountable on the spit for rotation therewith, said spaced ends including means with axially aligned aperture portions for receiving a spit and for supporting said spit basket on said spit and for providing a driving connection between said spit and said grill, a spit passing through said aperture portions, means on each side of said basket shaped grill, and an upper generally rectangular grid having spaced side portions, each being connected with a corresponding one of said means to maintain said upper grid on said basket shaped grill.

24. A rotatable food containing spit basket for articles of food mountable on a rotatable spit of a barbeque stand comprising, a spit, a generally rectangular shaped grill on the spit and rotatable therewith, first vertically spaced means on a first side of the grill, second vertically spaced means on a second side of said grill, said first side being oppositely disposed from said second side, and an upper grid having means near one side edge engaging with said first spaced means, said upper grid having means near the other side edge thereof engaging with said second spaced means for maintaining said upper grid on said basket shaped grill to close the same.

References Cited in the file of this patent

UNITED STATES PATENTS

| | | |
|---|---|---|
| 391,766 | Turner | Oct. 27, 1888 |
| 2,225,861 | Dufour | Dec. 24, 1940 |
| 2,297,825 | Bobo | Oct. 6, 1942 |
| 2,477,529 | Sprinkle | July 26, 1949 |
| 2,576,028 | Mitchell | Nov. 20, 1951 |
| 2,760,428 | Boyajian | Aug. 28, 1956 |